March 7, 1967 WAI-KEE WONG 3,308,386

SAMPLE AND HOLD CIRCUIT WITH REDUCED DRIFT BY MINIMIZING DIODE LEAKAGE CURRENT

Filed April 12, 1963

INVENTOR.

BY WAI-KEE WONG

Paul R. Harder

ATTORNEY

United States Patent Office 3,308,386

Patented Mar. 7, 1967

3,308,386

SAMPLE AND HOLD CIRCUIT WITH REDUCED DRIFT BY MINIMIZING DIODE LEAKAGE CURRENT

Wai-Kee Wong, San Francisco, Calif., assignor to Beckman Instruments, Inc., a corporation of California Filed Apr. 12, 1963, Ser. No. 272,754
9 Claims. (Cl. 328—151)

This invention relates to a solid-state switch and more particularly to a solid-state switch formed by a diode bridge in which the leakage current at the output junction is substantially reduced.

It is often desirable, particularly in the field of analog computing devices, to sample electrical signals and couple these sampled signals to an output or storage circuit. Ideally, the coupling circuit or switch utilized between the input circuit and the output or storage circuit, should have zero impedance during the sampling period and an infinite impedance during the hold period. Because of bouncing and ultimate wearing of the contacts of mechanical relays and of the fragility of vacuum tubes it is often desirable to construct the coupling circuit or switch of solid-state devices such, for example, as silicon or germanium diodes. It is the frequent practice to construct the solid-state switch in the form of a diode bridge with suitable switching circuitry for providing forward and reverse bias across the bridge. Such a switching circuit is not ideal. The solid-state diode when forward biased has a small forward impedance generally in the order of approximately 50 ohms.

A more serious limitation occurs during the holding period, that is, when the diodes are reverse biased. Since the solid-state diode does not have an infinite reverse impedance, when reverse biased a leakage current occurs and, even though small, is quite significant when the storage capacitor is also small, a requirement which results by virtue of maintaining the RC time constant within a tolerable minimum. Since the leakage current varies from diode to diode for a given reverse bias voltage, the summation taking place at the output junction of the switch causes a current to flow either into or out of the storage capacitor resulting in a voltage drift. Further, the leakage current of the individual diodes is also a function of temperature which, for reasons more fully detailed hereinafter, makes it impractical, if not totally impossible, to select diodes which have a like leakage current under even the most controlled conditions of use.

Various attempts have been made in the prior art to overcome the drift in the output voltage caused by diode leakage. While these methods have generally accomplished their purpose many do not decrease the disparity in the leakage current of the diodes adjacent the output junction sufficiently to allow their use in highly accurate analog computing systems nor do they take into account the effect of varying temperatures on the leakage current.

Several approaches to this problem have been utilized two of which will be briefly mentioned here. One approach has been to feed back a voltage to the diode bridge such that the voltage across the diodes adjacent the output junction is maintained constant regardless of the voltage across the storage element. In these cases this voltage is in the order of magnitude of 2–5 volts and is held at a constant value in reference to the voltage stored. This type of system does not take into account the fact that the leakage current for like voltages varies from diode to diode neither does it account for the fact that the leakage current is a function of the temperature of the diodes which also vary from diode to diode. A second method of leakage current compensation has been to either shunt the diodes with a variable resistor and/or to place a variable resistor in series with the diodes such that these resistors may be adjusted until the leakage current at the output junction is substantially zero. While such a system is generally satisfactory the circuit does not take into account the change in leakage current as a function of temperature which will be more fully discussed hereinafter.

Accordingly, it is the general object of the present invention to provide an improved solid-state switch having a minimum leakage current at the output junction when the switch is in the non-conductive condition.

Another object is to provide a solid-state switch for use in a sample and hold circuit which provides a minimum of voltage drift during the hold period.

A further object is the provision of a solid-state switch wherein the leakage current through the diodes adjacent the output junction have been substantially reduced under all conditions of service.

A more specific object is the provision of a solid-state switch wherein the difference in the leakage current through the diodes adjacent the output junction has been substantially reduced.

Another specific object of the invention is to provide a solid-state switch for a sample and hold circuit wherein the difference in the leakage current through the diodes adjacent to the output junction has been reduced to a point where the voltage drift at the output junction due to the leakage current through these diodes is less than the drift rate of the amplifier connected thereto.

To accomplish the foregoing objects the present invention generally contemplates a circuit wherein a pair of diodes are connected in electrical series circuit in each of the output arms of the bridge and wherein the reverse bias voltage across the diodes immediately adjacent the output junction is maintained very small in comparison to the reverse voltage across the other diode in the respective output arms. Nevertheless, the diodes adjacent the output junction remain reverse biased. To accomplish this result the present invention contemplates the utilization of respective impedance means connected between the junction of the series diodes in the output arms and a point of common potential such, for example, as ground. The impedance means has a value which is large in comparison with the impedance of the diode when the diode is forward biased or conductive but which is low compared to the impedance of the diode when the diode is reverse biased or non-conductive. Since the electrical impedance of the impedance means is low compared to that of the diodes adjacent the output junction when the switch is reverse biased substantially all of the reverse bias voltage appears across the series diodes remote from the output junction and very little voltage is dropped across the impedance means. Nevertheless, the small voltage drop across the impedance means is sufficient to maintain the diodes adjacent the output junction reversely biased and, since this reverse bias now is very small, the reverse current through the diodes adjacent to the output junction is likewise very small and the difference between these currents, that is, the current which causes drift in the holding voltage, is even smaller.

The invention may be more readily understood by reference to the following detailed description when considered in connection with the accompanying drawings wherein an exemplary preferred embodiment is illustrated and described in detail while the features of the invention that are believed to be novel are set forth with particularity in the appended claims.

acteristics of a typical solid-state diode.

Figure 1:
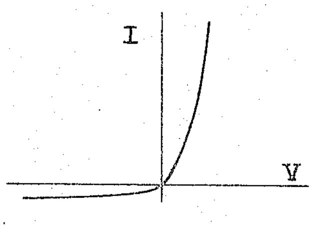
FIG. 1 is a graph illustrating the voltage-current characteristics of a typical solid-state diode.

Referring now to FIG. 1 there is illustrated the current-voltage curve of a typical diode. The equation of the curve for an ideal diode is:

$$I=I_s(e^{qv/KT}-1)$$

where:

$I_s$=the reverse bias saturation current
$q$=the charge of an electron
$v$=the bias voltage
$K$=Boltzmann's constant
$T$=absolute temperature At a temperature of 25° centigrade the exponent of $e$ is approximately v./0.026. It is apparent that when the bias voltage is −1.0 volt, the leakage current through the diode is approximately equal to the saturation current $I_s$. For a high quality commercial diode this leakage current may be expected to be in the order of 1 nanoampere. For randomly selected diodes the leakage current difference may be expected to be in the order of 0.3 nanoampere. Assuming that the storage capacitor has a value of 0.001 microfarad then from the drift rate equation:

$$\text{Drift rate}=\frac{V}{T}=\frac{I}{C}$$

it may be seen that the drift rate will be in the order of 300 millivolts/second. This drift rate is much too high to be acceptable for many analog computer applications.

It is also apparent from the diode equation that as the reverse voltage approaches zero the factor $e^{qv/KT}$ approaches zero. If the leakage current through a pair of diodes is made very small the difference between these currents is even smaller. Therefore, it is extremely desirable that the voltage across the diodes adjacent the output junction of the diode bridge be reduced to a value as small as possible yet maintaining these diodes reversely biased. This invention accomplishes that result.

The second problem, the effect of which is substantially reduced by the instant invention, is that the leakage current of a solid-state diode is not only a function of the reverse bias voltage but also a function of the temperature of the diode. During the sampling period in which the diodes are forward biased and conductive the current flowing through the diode junction heats the junction above that of the ambient conditions even though this current may be relatively small. Since the diode leakage current is a function of the temperature and is not a uniform function from diode to diode, a difference in the leakage current of the diodes occurs during the hold period as the diode junctions cool to the ambient temperature.

Figure 2:
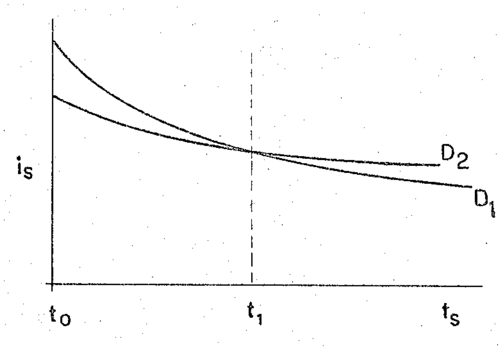
FIG. 2 is a graph illustrating the leakage current as a function of time of a pair of typical solid-state diodes illustrating the effect of temperature changes thereon.

FIG. 2 illustrates the leakage current of a pair of typical diodes as a function of time, the ordinate represents the beginning of the hold period, that is, the point in time when the switch is opened at the end of the sample period. Let it be presumed that prior to the sample period the leakage current through each diode had, by some suitable means, been made equal such that no difference current existed. The switch is then closed and the storage capacitor is charged during the sample period. Because of the different temperature-current characteristics of randomly selected diodes when the switch is again opened at the beginning of the hold period a difference current will now exist because of the heating of the diodes above ambient temperature during the sample period. Further, because of the different characteristics the diodes will have different rates of changes as the diodes cool to the ambient temperature. Thus, in the example illustrated, the diode $D_1$ has a larger leakage current than diode $D_2$ until time $t_1$ when the leakage is equal and thereafter diode $D_2$ has a higher leakage current than diode $D_1$. The effect on the sample and hold circuit is therefore a voltage drift first in one direction and then in the other, depending upon the positioning of the diodes in the switching circuit. It is again obvious that by reducing the reverse bias across the diodes the leakage current itself may be greatly reduced and therefore the drift of the storage circuit due to changes in temperature will accordingly be substantially reduced.

Figure 3:
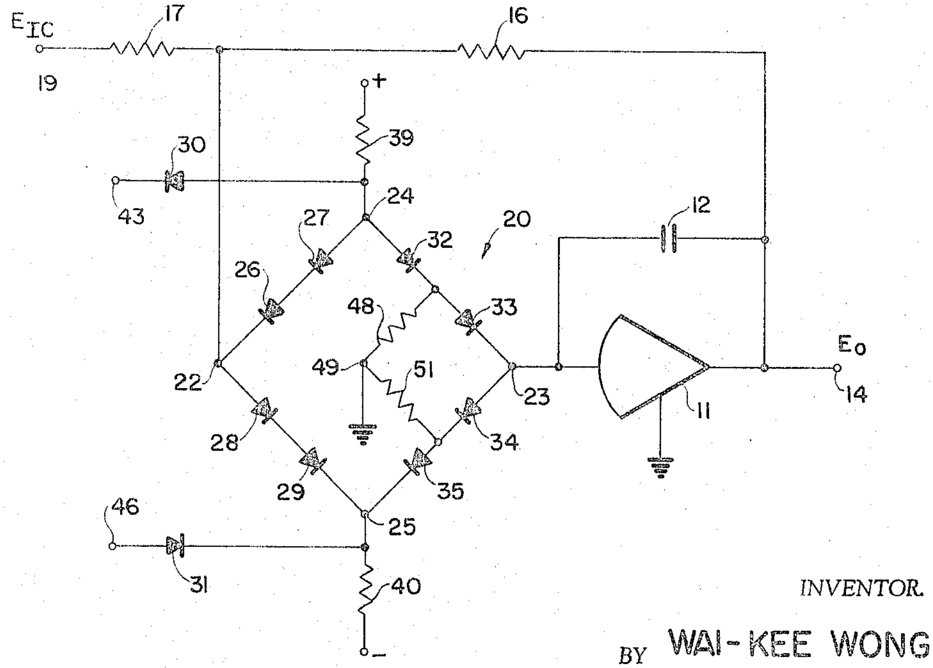
FIG. 3 is a schematic diagram of a typical sample and hold system for an analog computer embodying a solid-state switch constructed after the teachings of this invention.

Referring now to FIG. 3 there is illustrated a schematic diagram of a typical sample and hold circuit incorporating a solid-state switch embodying the instant invention. The sample and hold circuit generally comprises a single ended amplifier 11 having a feed back capacitor 12 connected between the input or grid and output terminals thereof. The output terminal of the amplifier 11 is directly connected to the output terminal 14 of the sample and hold circuit and feedback resistor 16 and input resistor 17 form an electrical series circuit between the initial condition input terminal 19 of the sample and hold circuit and output terminal 14. A solid-state switch generally indicated by the reference numeral 20 connects the junction of resistors 16 and 17 to the input terminal of amplifier 11.

In operation, when the switch is closed or biased conductive, the input voltage to be sampled, such, for example, as the initial condition voltage $E_{IC}$ for a computing integrator, is applied through input resistor 17 to the input of amplifier 11. If the amplifier has a high gain, such, for example, as $10^8$, the output will be approximately minus the ratio of the feedback resistor 16 to the input resistor 17 times the input voltage, that is;

$$E_0=-E_{IC}\cdot\frac{R_{fb}}{R_{in}}$$

Since for a high gain amplifier the current flowing through the input resistor 17 is equal to the current flowing through the feedback 16, the output of the amplifier is such that the potential at the junction of these resistors is held at substantially zero. Thus, the capacitor 12 is negatively charged to a value substantially equal to the input voltage $E_{IC}$ times the ratio of the feedback resistor to the input resistor. When the switch is opened or rendered nonconductive, the charge stored across capacitor 12 remains at the output terminal 14.

Referring now to the solid-state switch 20 in greater detail, the switch comprises an input junction 22, an output junction 23 and first and second switching junctions 24 and 25. The input junction 22 is directly connected to the junction of feedback resistor 16 and input resistor 17 and the output junction 23 is directly connected to the grid of amplifier 11. The diode bridge has a first input arm comprising diodes 26 and 27 serially connected between the input junction 22 and the first switching junction 24. A second input arm comprising diodes 28 and 29 serially connected between the input junction 22 and the second switching junction 25. Diodes 32 and 33 are serially connected between the first switching junction 24 and the output junction 23 so as to form a first output arm and diodes 34 and 35 are serially connected between output junction 23 and the second switching junction 25 to form the second output arm of the bridge. Each of the diodes are connected in such a manner that when the first switching junction is biased positive and the second switching junction is biased negative, current will flow from the first switching junction 24 through the input arms and the output arms in parallel to the second switching junction 25 and the bridge is forward biased. Under this condition the diodes represent a low impedance between the input junction 22 and the output junction 23 and any signal applied at the input junction will pass to the output junction with substantially no attenuation. The first switching junction 24 is connected through resistor 39 to a source of positive potential and the second switching junction 25 is connected through a like resistor 40 to a point of negative bias potential, each taken with reference to a point of reference or common potential such, for example, as ground.

Clamping diode 30 has its anode connected to the first switching junction 24 and its cathode connected to a terminal 43. Clamping diode 31 has its cathode connected to the second switching junction 25 and its anode connected to terminal 46. Terminals 43 and 46 are connected to the output of any suitable switch driving circuit, such, for example, as a Schmitt trigger, which is arranged such that when the potential at terminal 43 is positive the potential at terminal 46 is negative and vice versa. When the potential at the cathode of clamping diode 30 is positive and the potential at the anode of clamping diode 31 is negative, the clamping diodes are reverse biased and current flows from the source of positive bias potential through resistor 39, the input and output arms of the bridge thence though resistor 40 to the negative terminal of the bias source. Thus, each of the diodes in the bridge is forward biased and the potential applied at the input terminal 22 appears at the output terminal 23 as is well known to those skilled in the art.

When the potential at the cathode of clamping diode 30 is negative and the potential at the anode of clamping diode 31 is positive, clamping diodes 30 and 31 are rendered conductive thereby respectively clamping the first and second switching junctions 24 and 25 to these respective negative and positive potentials. Thus, the potential at switching junction 24 is negative with respect to the potential at the switching junction 25 and each of the diodes in the bridge is reverse biased and represents a high impedance between the input junction 22 and the output junction 23. Thus the switch is open or non-conductive. The clamping voltage applied to terminals 43 and 46 may typically be in the order of magnitude of ±4 volts, thus a total of 6–7 volts appears between the switching junctions 24 and 25. Under these conditions the leakage current through diodes 34 and 35 flows into output junction 23 while the leakage current through diodes 32 and 33 flows out of output junction 23. Any disparity in the value of these leakage currents will appear as a difference current either flowing into or out of the feedback capacitor 12. As has been hereinbefore pointed out, if this difference is as small as 0.3 nanoampere and capacitor 12 has a value of 0.001 microfarad the drift rate of the voltage $E_0$ appearing at the output terminal 14 of the sample and hold circuit will be approximately 300 millivolts/seconds.

An impedance means, such as resistor 48, is connected between the junction of diodes 32 and 33 in the first output arm of the bridge and a point of common or reference potential 49, such, for example as ground. A second impedance means, such as, resistor 51, is likewise connected between the junction of diodes 34 and 35 in the second output arm of the bridge and the point of common potential 49. If the impedance of resistors 48 and 51 is high compared to the impedance of diodes 33 and 34 when these diodes are forward biased it is readily apparent that the introduction of the impedances into the circuit will have no substantial effect on the transfer of the sampled signal from input junction 22 to output junction 23. On the other hand, it is also apparent that if the impedance of resistors 48 and 51 is low compared to the impedance of diodes 32–35 when these diodes are reverse biased the voltage drop appearing across resistors 48 and 51 will be extremely small compared to the voltage dropped across diodes 32 and 35. That is, the leakage current through diode 35 now flows through resistor 51 to the point of common potential 49 and the leakage current through diode 32 now flows from the point of common potential 49 through resistor 48 and diode 32 to the negatively biased junction 24. Since substantially all of the reverse bias voltage appears across diodes 32 and 35 only a very small amount is dropped across diodes 33 and 34 which, by proper selection of the diodes and the magnitude of resistors 48 and 51, may be made in the millivolt region. Yet, diodes 33 and 34 are maintained reversely biased.

Referring again to FIG. 1, it is apparent that if the reverse bias of the diode is in the millivolt region the leakage current produced is very small and the difference between the leakage current through diodes 33 and 34 will be even smaller, consequently the drift rate is also very small.

In an exemplary practical embodiment of the invention the following components and circuit parameters were utilized:

| | |
|---|---|
| Diodes 32–35 ---------- | 1N300, Raytheon. |
| Diodes 26–31 --------- | CD6111, Continental Device. |
| Resistors 39, 40 ------- | 50,000 ohms. |
| Resistors 48, 51 ------- | 1,000,000 ohms. |
| Bias source ----------- | ±100 volts. |
| Switching voltage ------ | ±4 volts. |

Utilizing the foregoing parameters, randomly selected diodes, and a 0.001 microfarad capacitor at approximately 35° C. starting with 100 volts across the capacitor, a drift rate in the order of 10 millivolts/second was obtained. Thus the drift rate has been reduced by utilization of the present invention by a factor of approximately 30. Other actual measurements of the drift rate of an integrator with the switch in the non-conductive or reverse biased condition indicates that the drift rate due to the switch is less than the drift rate of the integrator with the switch removed. Since the initial disparity of the leakage current through the diodes adjacent the output junction is greatly reduced the effects of temperature change of the junctions during the hold period is also greatly reduced. Actual measurements on the circuit utilizing the foregoing values show that the total reverse bias across the bridge is approximately 6 volts and that the voltage from the junction of diodes 32 and 33 to the junction of diodes 34 and 3 is approximately 6 mv. Thus, the ratio of the voltage across the diodes 32 and 35 to the voltage across diodes 33 and 34 is 1000.

There has been illustrated and described a solid-state switch having improved non-conductive characteristics in that the leakage current in the diodes adjacent the output junction has been greatly reduced therefore reducing the difference between the leakage flow therethrough which causes drift of the voltage of the output junction when utilized in conjunction with a sample and hold circuit. Since the leakage current through the diodes has been reduced for all operating conditions, the effect of the change in the leakage current as the diodes cool after the sampling period is also greatly reduced. It should of course be understood that the sample and hold circuit illustrated may be used as the integrating amplifier by the addition of an integrate input connected to the grid of amplifier 11 as is well known in the art.

Although FIG. 3 has been illustrated as an exemplary embodiment of the present invention, it is to be understood that other embodiments and modifications thereof are possible and apparent to those skilled in the art without departing from the spirit of the invention and the scope of the appended claims.

What is claimed is:

1. A switching device for a sample and hold system comprising:

a diode bridge having a pair of input arms connected to form an input junction and a pair of output arms connected to form an output junction, each of said pair of output arms respectively including a pair of diodes;

a point of substantially constant reference potential;

and impedance means connecting the respective junctions of the pair of diodes in each of said pair of output arms to said point of reference potential.

2. A switching device for a sample and hold system comprising:

a diode bridge having a pair of input arms connected to form an input junction and a pair of output arms connected to form an output junction, each of said pair of output arms respectively including a pair of diodes;

a point of substantially constant reference potential;

first impedance means connecting the junction of said pair of diodes in one of said pair of output arms to said point of reference potential;

and second impedance means connecting the junction of said pair of diodes in the other of said pair of output arms to said point of reference potential.

3. A switching device for a sample and hold system comprising:

a diode bridge having a pair of input arms connected to form an input junction and a pair of output arms connected to form an output junction, each of said pair of output arms respectively including a pair of serially connected diodes;

a point of substantially constant reference potential;

and impedance means connecting the respective junctions of said pair of diodes in each of said ouput arms to said point of reference potential, said impedance means having an electrical impedance that is high relative to the impedance of said diodes when said switching device is in the conductive condition and that is low relative to the impedance of said diodes when said switching device is in the non-conductive condition.

4. In a switching device for a sample and hold system, the improvement comprising:

a diode bridge having first and second input arms connected to form an input junction and respectively including at least one diode, said bridge further including first and second output arms connected to form an output junction and respectively including at least a pair of diodes connected in electrical series circuit to form respectively first and second junctions therebetween;

a point of reference potential;

a first resistor only connecting said first junction to said point of reference potential;

and a second resistor only connecting said second junction to said point of reference potential.

5. In a switching device for a sample and hold system, the improvements comprising:

a diode bridge having first and second input arms connected to form an input junction and respectively including at least one diode, said bridge further including first and second output arms connected to form an output junction and respectively including at least a pair of diodes connected in electrical series circuit to form respectively first and second junctions therebetween;

a point of reference potential;

a first resistor only connecting said first junction to said point of reference potential;

a second resistor only connecting said second junction to said point of reference potential;

said first and second resistors having an impedance that is high relative to the impedance of said diodes when said diodes are forwardly biased and that is low relative to the impedance of said diodes when said diodes are reversely biased.

6. A sample and hold system comprising a combination of:

a diode bridge having first and second input arms connected to form an input junction, said bridge further including first and second ouput arms connected to form an output junction and respectively at least a pair of diodes;

means connected to said diode bridge for selectively rendering said diode bridge conductive and nonconductive;

a point of substantially constant reference potential;

impedance means connecting the respective junctions of said pair of diodes in each of said first and second output arms to said point of reference potential;

a storage device connected to said output junction, said storage device holding the potential of said output junction at substantially said reference potential.

7. A sample and hold system comprising the combination of:

a diode bridge having first and second input arms connected to form an input junction, said bridge further including first and second output arms connected to form an output junction and respectively including at least a pair of diodes connected in electrical series circuit to form respectively first and second junctions therebetween;

a point of substantially constant reference potential;

a first impedance only connecting said first junction to said point of reference potential;

a second impedance only connecting said second junction to said point of reference potential;

means connected to said diode bridge for selectively rendering said diode bridge conductive and non-conductive;

a storage device connected to said output junction, said storage device holding the potential at said output junction at substantially said reference potential;

said first and second impedance means having an impedance that is high relative to the impedance of said diodes when said diode bridge is conductive and that is low relative to the impedance of said diodes when said diode bridge is non-conductive.

8. A sample and hold system for use in an analog computer, the combination comprising:

a solid-state diode bridge having first and second input arms connected to form an input junction and respectively including at least one diode, first and second output arms connected to form an output junction and respectively including at least a pair of diodes;

an amplifier having an input terminal, an output terminal and a common terminal;

means connecting said output junction to said input terminal;

feedback means interconnecting said output terminal and said input junction;

storage means connected between said input terminal and said output terminal;

impedance means respectively connecting the junction of said pair of diodes in each of said first and second output arms to said common terminal;

and switching means connected to said diode bridge for selectively rendering said diode bridge conductive and non-conductive.

9. A sample and hold system for use in an analog computer, the combination comprising:

a diode bridge having first and second input arms connected to form an input junction and respectively including at least one diode, said bridge further including first and second output arms connected to form an output junction and respectively including at least a pair of diodes connected in electrical series circuit to form respectively first and second junctions therebebetween;

a point of reference potential;

a first resistor only connecting said first junction to said point of reference potential;

a second resistor only connecting said second junction to said point of reference potential;

said first and second resistors having an impedance that is high relative to the impedance of said diodes when said diodes are forwardly biased and that is low relative to the impedance of said diodes when said diodes are reversely biased;

an amplifier having an input terminal connected to said output junction, a common terminal connected to said point of reference potential and an output terminal;

feedback means connecting said output terminal to said input junction;

storage means connected between said input terminal and said output terminal;

and means connected to said diode bridge for selectively rendering said bridge conductive and non-conductive.

References Cited by the Examiner

UNITED STATES PATENTS

| | | | |
|---|---|---|---|
| 3,052,851 | 9/1962 | Herberling | 328—121 |
| 3,075,086 | 1/1963 | Mussard | 307—88.5 |

ARTHUR GAUSS, *Primary Examiner.*

J. JORDAN, *Assistant Examiner.*